Patented June 5, 1951

2,555,731

UNITED STATES PATENT OFFICE 2,555,731

OIL PRODUCED FROM EGGS

Weaver B. Cooper, Akron, Ohio

No Drawing. Application September 26, 1949,
Serial No. 117,939

2 Claims. (Cl. 99—113)

My invention relates to the production of oil from eggs.

An object of the present invention is to provide a method of obtaining a new oil product from the yolks of eggs.

Another object of the invention is to provide an oil of the character described which is highly beneficial as a healing medicant for external use.

Other objects of the invention will be manifest by reference to the following brief description.

I have found that an oil may be produced from eggs in the following manner: Boil eleven hen's eggs until very hard, as for example for fifteen minutes; remove the yolks from the said hard-boiled eggs and place these yolks in a pan or similar cooking vessel and cook the same over a heating element, using a relatively small amount of water or fat as a starter or accelerator, until the yolks are reduced substantially completely to a dark brown liquid, in the present instance approximately four ounces by liquid measure.

The liquid thus produced is an oil substance, substantially thick but of flowable viscosity.

I have discovered that the product of the foregoing process is highly beneficial as an external medicant, as an ameliorating agent for skin ailments and alleviating the effects of running sores, insect bites etc.

Other modes of rendering the hardened egg yolks may be utilized, such as by use of a pressure cooker. Also it is possible to refine the product by known methods.

I do not confine myself to the exact proportions described above or to the use of hen's eggs, as eggs of other fowls may be equally satisfactory. Favorable results are also obtainable by boiling the eggs for shorter or longer periods than described, providing the yolks are substantially hard-boiled. Other reasonable modifications may be resorted to without departing from the spirit of the invention or the scope of the appended claims.

What is claimed is:

1. A method of producing oil from fowl's eggs comprising the steps of hard boiling the eggs, removing the hard-boiled yolks from the eggs, and substantially completely reducing said yolks in the presence of a liquid starting and accelerating agent to an oily liquid by rendering the same in a vessel by heat.

2. A method of producing oil from hen's eggs comprising the steps of hard boiling the eggs, removing the hard-boiled yolks from the eggs, and substantially completely reducing said yolks in the presence of a liquid starting or accelerating agent to a dark brown oily liquid by rendering.

WEAVER B. COOPER.

REFERENCES CITED

The following references are of record in the file of this patent:

FOREIGN PATENTS

| Number | Country | Date |
|---|---|---|
| 2,217 of 1860 | Great Britain | Sept. 13, 1860 |

OTHER REFERENCES

King, J., "American Dispensatory," 8th edition, published 1870, Cincinnati, page 594 only.